US012612258B2

(12) United States Patent
DePaso

(10) Patent No.: US 12,612,258 B2
(45) Date of Patent: Apr. 28, 2026

(54) VACUUM CONVEYOR

(71) Applicant: Laitram, L.L.C., Harahan, LA (US)

(72) Inventor: Joseph M. DePaso, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 137 days.

(21) Appl. No.: 18/692,874

(22) PCT Filed: Sep. 21, 2022

(86) PCT No.: PCT/US2022/044235
§ 371 (c)(1),
(2) Date: Mar. 18, 2024

(87) PCT Pub. No.: WO2023/055629
PCT Pub. Date: Apr. 6, 2023

(65) Prior Publication Data
US 2024/0375881 A1     Nov. 14, 2024

Related U.S. Application Data

(60) Provisional application No. 63/251,096, filed on Oct. 1, 2021.

(51) Int. Cl.
B65G 21/20 (2006.01)
B65G 43/00 (2006.01)

(52) U.S. Cl.
CPC ......... B65G 21/2036 (2013.01); B65G 43/00 (2013.01); *B65G 2201/0252* (2013.01); *B65G 2203/042* (2013.01)

(58) Field of Classification Search
CPC ............... B65G 21/2036; B65G 43/00; B65G 2201/0252; B65G 2203/042

(Continued)

(56) References Cited

U.S. PATENT DOCUMENTS

| 4,560,060 A | 12/1985 | Lenhart |
| 4,669,604 A | 6/1987 | Lenhart |

(Continued)

FOREIGN PATENT DOCUMENTS

| AT | 523175 B1 | 6/2021 |
| DE | 102019114983 B3 | 8/2020 |

(Continued)

OTHER PUBLICATIONS

JP2005008374 (Year: 2005).*

(Continued)

*Primary Examiner* — Gene O Crawford
*Assistant Examiner* — Lester Rushin, III
(74) *Attorney, Agent, or Firm* — James T. Cronvich

(57) ABSTRACT

A closed-loop vacuum conveyor controlling the pressure in a plenum. Pressure sensors in the plenum send pressure signals to a processor that controls the speed of a blower motor sucking air from the plenum and through openings in a foraminous conveyor belt against which conveyed aluminum cans are held by air pressure. The processor controls the blower speed with a variable-frequency drive to adjust the pressure in the plenum to accommodate a varying product density or the shape, size, or weight of conveyed products on the outer surface of the conveyor belt. The plenum may be divided into separate chambers by partitions or adjustable dampers. The pressure in the chambers can be controlled by adjusting each chamber's blower speed or the opening of its dampers.

22 Claims, 4 Drawing Sheets

(58) Field of Classification Search
USPC ......................................................... 198/811
See application file for complete search history.

(56) References Cited

U.S. PATENT DOCUMENTS

| | | | |
|---|---|---|---|
| 4,670,935 | A | 6/1987 | Pedersen |
| 4,856,262 | A | 8/1989 | Iwasa et al. |
| 5,284,238 | A | 2/1994 | Ingraham |
| 5,605,217 | A | 2/1997 | Risley et al. |
| 5,762,174 | A | 6/1998 | Risley et al. |
| 5,857,605 | A | 1/1999 | Welch et al. |
| 6,446,789 | B1 | 9/2002 | Goodman |
| 7,296,792 | B2 | 11/2007 | Kondratuk et al. |
| 8,678,885 | B2 | 3/2014 | Staudenrausch |
| 8,733,538 | B2 | 5/2014 | Jones |
| 10,442,629 | B2 * | 10/2019 | Lyman ............... B65G 21/2036 |
| 10,968,049 | B2 * | 4/2021 | Swearman ............. B65G 43/08 |
| 11,945,660 | B2 * | 4/2024 | Schlezinger ........... B65G 47/71 |

FOREIGN PATENT DOCUMENTS

| | | |
|---|---|---|
| EP | 2196416 B1 | 3/2014 |
| JP | 06-183552 A | 7/1994 |
| JP | 07-247020 A | 9/1995 |
| JP | 2000211767 A | 8/2000 |
| JP | 2005008374 A | 1/2005 |

OTHER PUBLICATIONS

WO2023055629 (Year: 2022).*
CA3036087 (Year: 2018).*
JP4440547 (Year: 2010).*
Extended European Search Report, European Patent Application No. 22877153.1, mailed Apr. 25, 2025, European Patent Office, Munich, Germany.
"Vacuum Transfer" brochure, Descon Integrated Conveyor Solutions, Newmarket, ON, Canada, Mar. 2019.

* cited by examiner

VACUUM CONVEYOR

BACKGROUND

The invention relates generally to power-driven convey- ors and more particularly to vacuum conveyors.

Vacuum conveyors use an induced pressure differential across the surface of a conveyor belt to hold product, usually against the force of gravity. Vacuum conveyors include a structural plenum with one or more open sides over which a conveyor belt is supported by an open carryway such as UHMW rails. The belt seals the plenum pressure boundary. The belt is typically foraminous with multiple through holes, slits, or other openings providing the belt with open areas through which air can flow. The belt is driven by a motor- driven drive shaft providing belt motion over the carryway to transport product. A pressure differential is established across the belt surface by taking suction on the plenum with a blower. In low differential-pressure applications, the blower is generally a centrifugal blower. Higher differential- pressure applications use a multistage blower. Axial fans may be used instead.

Vacuum conveyors are used to transport and manipulate products usually in mass, but sometimes in single file. They are used for product processes such as elevating, changing orientation, holding for precise operations, and dropping misoriented or damaged products from the production flow. They are often used in the aluminum-can manufacturing process.

Centrifugal air blowers are turbomachines with distinc- tive performance-flow and power-requirement curves. In a stable operating range, airflow increases as pressure in the plenum decreases. Power requirements increase as airflow increases.

Blower performance-flow curves are a function of blower speed. Increasing speed raises the performance-flow curve; conversely, decreasing speed lowers the performance-flow curve. Airflow resistive loads such as suction and discharge piping, but especially the foraminous belt that seals the plenum, have an opposing performance curve. Airflow increases as differential pressure increases.

The number of through holes or the percentage of open area of the moving conveyor belt occluded by conveyed products continuously changes with production flow—from extremes of no product population to a saturated condition with full product flow. Thus, the belt resistive airflow performance curve continuously changes. Typically, the product population fluctuates but operates somewhere in between, but on the side of high product population. The system is sized to "pick" and "hold" the first product on an unpopulated belt but spends most of its operating time in high population (low net open area) conditions.

For a given blower speed, blower power requirements are highest for high airflow conditions (empty and low product population). Power requirements are generally lowest in the stable blower operating range for low airflow (full and near full product population).

Typically, vacuum systems operate open loop at high horsepower in the 30 to 50 horsepower range. Blower motors must be sized to handle the worst-case low or empty product population condition for which the power requirement is greatest. The system spends a low percentage of its operating time in the worst-case condition. For high product population, the power requirements of the blower drop, and the motor oper- ates at a fraction of its rated power. Motor electrical efficiency drops, and power consumption increases when blower motors are forced to operate at a fraction of their designed power rating. And the conveyor system is forced to operate at fluctuating vacuum levels (differential pressure at the belt openings to the ambient atmosphere). Higher vacuum levels can be detrimental to product-holding performance and, in some cases, can deform the product and increase product spoilage.

SUMMARY

One version of a vacuum conveyor for securely holding products comprises a carryway extending along an open side of a plenum and a foraminous conveyor belt configured to advance along the carryway and seal the open side of the plenum. The conveyor belt has an outer surface and a plurality of openings. One or more pressure sensors are disposed in the plenum at sensor locations to measure the air pressure at the sensor locations and provide one or more air-pressure signals. A blower coupled to the plenum sucks air from the plenum to lower its air pressure and draw air through the openings in the conveyor belt to hold conveyed products to the conveyor belt's outer surface. A variable- frequency drive adjusts the speed of the blower. A processor receives the one or more air-pressure signals from the one or more pressure sensors and controls the variable-frequency drive to adjust the speed of the blower to adjust the air pressure in the plenum to accommodate a varying product density, or the shape, size, or weight of conveyed products on the outer surface of the conveyor belt.

Another version of a vacuum conveyor for securely holding products comprises a carryway extending along an open side of a plenum and a foraminous conveyor belt configured to advance along the carryway and seal the open side of the plenum. The conveyor belt has an outer surface and a plurality of openings through the outer surface. One or more adjustable dampers divide the plenum into two or more plenum chambers that open onto the open side of the plenum. One or more pressure sensors are disposed in the plenum chambers at sensor locations to measure the air pressure at the sensor locations in the plenum chambers and provide air-pressure signals. A blower coupled to the plenum sucks air from the plenum to lower its air pressure and draw air through the openings in the conveyor belt and hold conveyed products to the conveyor belt's outer surface. A processor receives the one or more air-pressure signals from the one or more pressure sensors and controls the adjustable dampers to adjust the air pressure in the plenum chambers to accommodate a varying product density or the shape, size, or weight of conveyed products on the outer surface of the conveyor belt.

Yet another version of a vacuum conveyor for securely holding products comprises a carryway extending along an open side of a plenum and a foraminous conveyor belt configured to advance along the carryway and seal the open side of the plenum. The conveyor belt has an outer surface and a plurality of openings through the outer surface. One or more pressure sensors are disposed in the plenum at sensor locations to measure the air pressure at the sensor locations and provide one or more air-pressure signals. A blower coupled to the plenum sucks air from the plenum to lower its air pressure and draw air through the openings in the conveyor belt and hold conveyed products to the conveyor belt's outer surface. A variable-frequency drive adjusts the speed of the blower. A processor receives the one or more air-pressure signals from the one or more pressure sensors and controls the variable-frequency drive to shift the pressure-flow performance curve of the blower to match the net resistive airflow curve.

DETAILED DESCRIPTION

Figure 1:
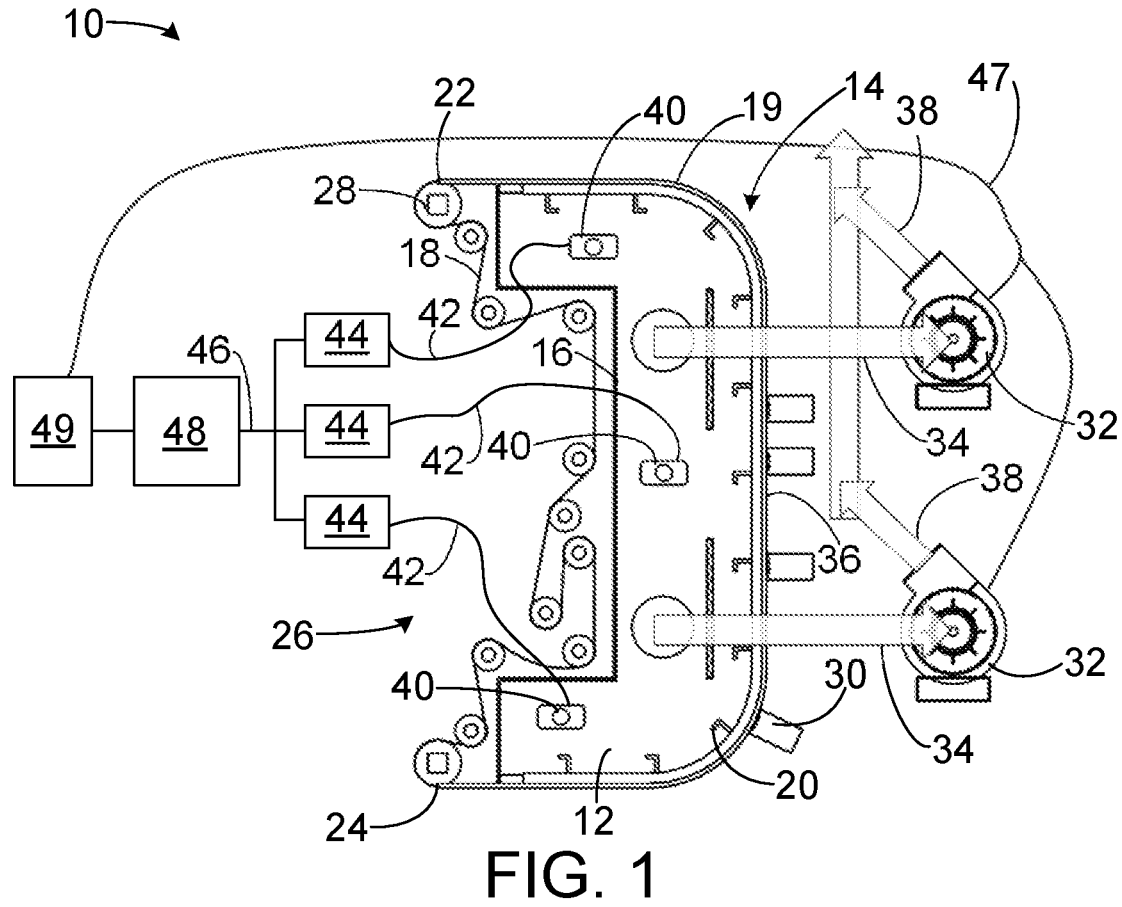
FIG. 1 is a schematic of one version of a vacuum conveyor embodying features of the invention.

A schematic of one version of a vacuum conveyor is shown in FIG. 1. The vacuum conveyor 10 comprises a plenum 12 having an open side 14 and walls 16 forming closed sides. An endless foraminous conveyor belt 18 having open areas formed by through holes, slits, or other openings conveys products along a carryway 19 supported by carryway supports 20 along the plenum's open side 14. The endless conveyor belt 18 returns from the exit end 22 of the carryway to the start end 24 of the carryway around a series of sprockets or pulleys and idle sprockets or rollers in a return 26. One of the sets of sprockets or pulleys at the exit end 22 of the carryway is a motor-driven drive sprocket 28 that drives the conveyor belt 18 along its path. In this example the vacuum conveyer is shown conveying empty aluminum cans 30 up a vertical incline against the force of gravity. In a vacuum conveyor conveying cans down an inclined carryway, the exit end and the drive sprocket or pulley would be at the bottom and the start end and the idle sprockets or rollers would be at the top. Alternatively, the conveyor belt could be center-driven by a drive sprocket in the return with idle sprockets or rollers at the start and exit ends of the carryway. The vacuum conveyor 10 shown in this example is a D-up inverter owing to its D shape and its 180° inversion of the cans 30 from dome-up at the start end 24 of the carryway 19 to dome-down at the exit end 22. Other vacuum-conveyor configurations for conveying cans or other products up or down inclines or horizontally can use the features described by way of example with respect to the D-up inverters of FIGS. 1 and 3-7. Examples of other vacuum-conveyor configurations include Z shapes, L shapes, inverted Z and L shapes, and horizontal conveyors. And for those conveyors having inclined or vertical carryways, examples include operation in the up or the down direction. Any vacuum-conveyor shape or operating direction may have critical zones where it is desirable to control pressure at different levels. The D-up inverter is just one such example.

Two blowers 32, including blower motors, are coupled in fluid communication with the plenum 12 through suction pipes 34. The blowers 32 suck air from the plenum 12 to decrease its air pressure and increase the magnitude of the gauge pressure, i.e., the differential pressure relative to the ambient atmospheric pressure. The pressure differential draws air through the belt's open area, and the resulting greater ambient pressure outside the belt holds the cans 30 stably against the belt's outer surface 36. The blowers 32 exhaust the air to the atmosphere through exhaust pipes 38. Although two blowers 32 are shown in FIG. 1, a single blower or more than two blowers could be used depending on the size of the plenum, the physical characteristics of the conveyed products, and the size of the blowers, for example. Blowers may alternatively be mounted directly to the plenum to eliminate the suction piping.

Pressure sensors 40 are positioned at sensor locations inside the plenum 12 to measure the air pressure at those locations. Differential pressure sensors mounted so as to protrude through the walls 16 to measure the difference between the plenum pressure and the ambient pressure outside the plenum can be used. Alternatively, absolute pressure sensors mounted inside the plenum and one or more absolute pressure sensors outside the plenum measuring ambient air pressure can be used together. In that case the differential pressure is determined from the difference between their readings. The sensors 40 send pressure signals 42 to signal-conditioning circuits 44, which convert the raw pressure signals into signals compatible with the input ports 46 of a programmable processor 48 such as a microprocessor or microcontroller. The signal-conditioning circuits 44 may include filters to filter noise out of the raw pressure signals 42 and amplifiers to amplify the signals to appropriate levels for an analog-to-digital converter in the processor 48 or in the signal-conditioning circuits 44.

The processor 48 receives the conditioned pressure signals and executes program instructions stored in a program memory to send a speed signal to a variable-frequency drive 49 to adjust the speed of the motors of the blowers 38 over control lines 47. By adjusting the blower speed, the processor 48 controls the air pressure in the plenum 12 and, consequently, the airflow through the foraminous belt 18. In that way a constant differential pressure independent of product density on the belt is maintained as indicated by the graph in FIG. 2. The processor 48 can also start and stop the blowers 38 to match demand.

Figure 2:
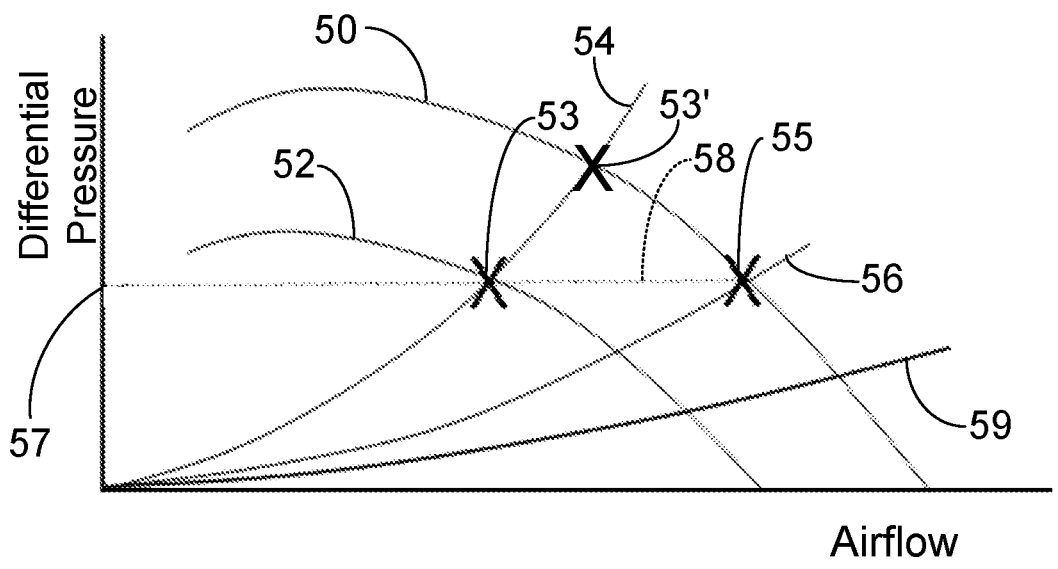
FIG. 2 is a graph of differential pressure and airflow in a vacuum conveyor as in FIG. 1.

The graph in FIG. 2 shows blower pressure-flow performance curves at maximum and lower speeds. The maximum-speed blower curve 50 shows that, in the stable operating region to the right of the peak of the curve, airflow decreases as the magnitude of the differential pressure increases. (Maximum speed means the maximum blower speed necessary to handle an empty-belt condition, not necessarily the blower's rated top speed.) A lower-speed blower curve 52, representing the blower's pressure-flow performance at lower speeds, is similar to the high-speed curve but shifted down.

The graph also shows resistive airflow curves for the conveyor at different product-density levels. The resistance to airflow due to the blower suction piping, the exhaust piping, and associated components, excluding the belt, is indicated by a resistive airflow curve 59. An empty-belt net resistive airflow curve 56 represents the belt's resistance to airflow when the belt is empty as well as the resistance in the suction pipes and the exhaust pipes, which is indicated by the piping resistance curve 59. A fully-loaded-belt net resistive airflow curve 54 represents the belt's resistance to airflow when the belt is full as well as the resistance in the suction pipes and the exhaust pipes. In an open-loop system, the blowers would be operated at a constant speed corresponding to the maximum-speed blower pressure-flow performance curve 50. Typically, the blower would be sized for some minimum pressure differential when the belt is unpopulated, as indicated by the intersection 55 of empty-belt net resistive airflow curve 56 with the blower performance curve 50. As the belt resistive airflow increases with product population density, the fully-loaded-belt net resistive airflow curve 54 applies. Since the system can operate only at the intersection of the blower performance curve with the changing resistive air flow curves, in an open-loop fully-loaded condition, blower performance curve 50 intersects fully-loaded resistive curve 54 at 53'. The net pressure differential increases from intersection 55 to intersection 53'. The operating point 53' would be the intersection of the maximum-speed blower curve 50 and the fully-loaded-belt net resistive airflow curve for the fully-loaded condition.

In a closed-loop system in which the control scheme executed by the processor is, for example, to maintain a constant differential air pressure as indicated by a constant-pressure setpoint 57 and a linear operating path 58, the blower speed is modulated and decreased below that of the maximum-speed blower curve 50 as indicated by the lower-speed blower pressure-performance curve 52. The closed-loop full-load operating condition is the intersection of blower pressure-performance curve 52 with the fully-loaded-belt net resistive curve 54 at a first operating point 53. The empty-belt net resistive airflow curve 56 intersects the high-speed blower curve 50 at a second operating point 55, which defines the maximum speed at which the blower would have to be run to maintain the constant differential pressure setpoint 57 for an empty belt. By adjusting the blower speeds up and down, the processor is shifting the blower pressure-performance curve 52 up and down in FIG. 2 to match the net resistive airflow. Such a closed-loop control scheme has the added benefit of reducing blower power requirements as the blower pressure-flow performance curves modulate between the blower curves 50 and 52. Control schemes having operating paths other than the constant-pressure linear curve 58 can alternatively be implemented based on product size, shape, weight, local air flow characteristics, and other production demands that change with production rate. The pressure setpoint 57 can be set as a function of the kind of product being conveyed to adapt the vacuum conveyor to a variety of products having different weights and centers of gravity. The processor may also limit the speed of the blower to a predetermined maximum speed to prevent overspeeding beyond safe operating speeds.

By maintaining the pressure in the plenum constant, the processor, in the closed-loop control system, adjusts the blower speeds to apply a more constant suction force to the cans independent of the can density on the belt. Thus, no more power than is necessary is expended in running the blowers.

Figures 3, 4:
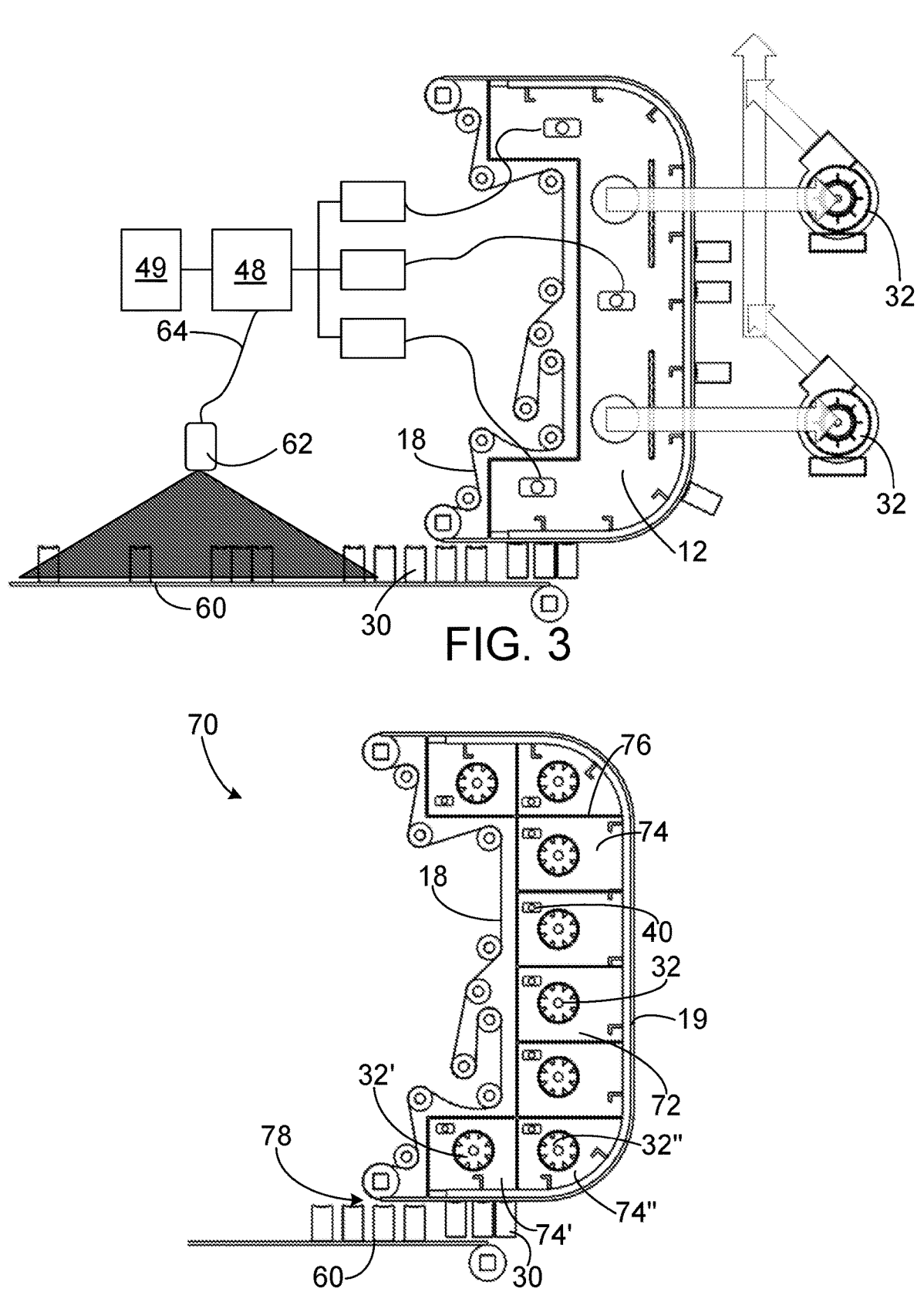
FIG. 3 is a schematic of another version of a vacuum conveyor as in FIG. 1, but with a look-ahead sensor measuring product density.
FIG. 4 is a schematic of yet another version of a plenum portion of a vacuum conveyor as in FIG. 1, but with multiple plenum chambers.

Another version of a vacuum conveyor is shown in FIG. 3. The vacuum conveyor system is largely the same as the system in FIG. 1, but with an additional sensor input to the processor. FIG. 3 also shows an infeed conveyor 60 delivering cans 30 to the foraminous conveyor belt 18 running on the plenum 12. The infeed conveyor 60, although not shown in FIG. 1, would be used in FIG. 1 to deliver cans 30 to the foraminous belt. A product-density sensor 62, such as a camera or rangefinder, for example, monitors the density of cans 30 on the infeed conveyor 60 and sends a product-density signal 64, which may be a camera or rangefinder frame covering a portion of the infeed conveyor, to the processor 44. The processor 44 executes program instructions to compute the product density and control the variable-frequency drive 49 to adjust the speed of the blower or blowers 32 to achieve the desired pressure differential. The product-density sensor 62 allows the processor to anticipate upcoming can densities on the belt 18. For timely and robust control of this and other multiple-chamber plenums, a shaft encoder or other means for determining the speed of the conveyor belt may be used by the processor to control the pressures to accommodate the varying product densities as the products advance along the carryway.

Yet another version of a vacuum conveyor is shown in FIG. 4. In this version the vacuum conveyor 70 differs from the vacuum conveyor 10 of FIG. 1 in that the plenum 72 is divided into separate chambers 74 by intervening partitions 76. Each chamber 74 houses a dedicated pressure sensor 40 and is in fluid communication with a dedicated blower 32. Although not shown, each pressure sensor 40 is connected to its own signal-conditioning circuit, and each blower is connected to its own variable-frequency drive, which are all controlled by a single processor or by individual processors for each chamber 74. The multi-chambered plenum 72 allows the pressure in each chamber to be independently controlled, which improves performance for varying can densities along the length of the belt 18. Pressure control of individual chambers may differ from the pressure control of other chambers to optimize product-handling performance in that portion of the vacuum conveyor.

The initial chamber 74' in the plenum 72 forms a pickup zone used to lift the cans 30 from the infeed conveyor 60 to the foraminous belt 18. Because, for some product shapes or weights, greater power is required to lift cans 30 across the intervening gap 78 than to hold cans against the belt in the vertical portion of the carryway 19, the pickup blower 32' for the pickup chamber 74' would typically be operated at a speed sufficient to produce enough of an increased pressure differential to prevent the cans from sliding down the incline. That could mean operating the pickup blower 32' at a higher speed than the speeds of the other blowers 32. It would alternatively be possible to use a high-speed blower 32' running at a constant speed open loop without a pressure sensor. Such an initial pickup chamber operated open loop could be used in the vacuum conveyors of FIGS. 1 and 3 as well. In other cases a greater pressure differential is required in the vertical portion of the carryway 19 to prevent the cans from sliding down. It's also possible that a large pressure differential in the pickup chamber 74' could cause can-destabilizing air currents in the gap 78. To prevent that from occurring, the pickup blower 32' could be operated at a lower speed to decrease the pressure differential and help stabilize the cans. That could mean operating the pickup blower 32' at a speed lower than the speeds of the other blowers 32. Furthermore, blowers 32" for radius plenum chambers 74" at one or both of the upper and lower corners of the vacuum conveyor 70 at which the carryway 19 makes a turn could be operated at high speeds to produce a pressure differential that compensates for leakage paths between the products and the conveyor belt 18 as it negotiates the corner turns. Independent control of the pressure in multiple zones provides the vacuum conveyor 70 with the versatility to adjust to various products, ambient conditions, such as process disturbances that can destabilize the conveyed products, and conveyor belt styles.

Figure 5:
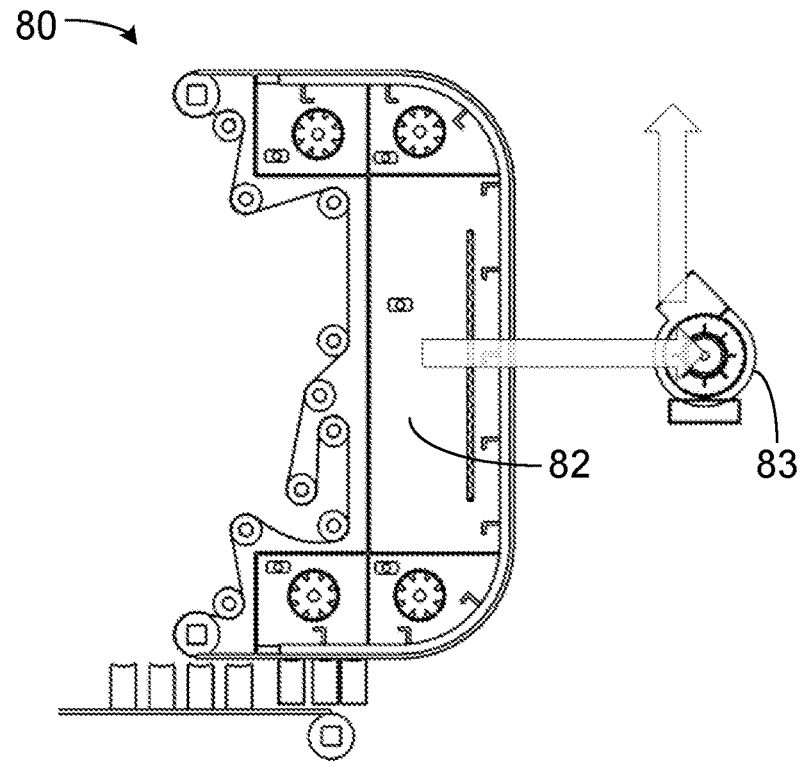
FIG. 5 is a schematic of the plenum portion of a vacuum conveyor as in FIG. 4, but with a single vertical plenum chamber.
Figure 6:
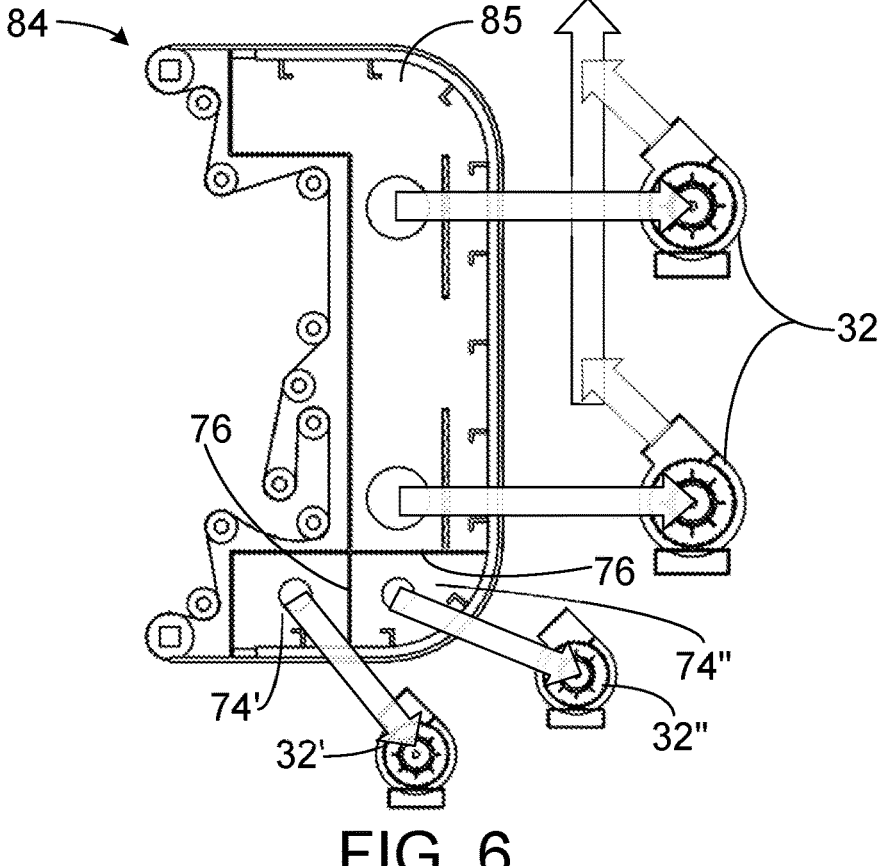
FIG. 6 is a schematic of the plenum portion of the vacuum conveyor as in FIG. 5, but with the vertical plenum chamber extended to include the upper radius and exit regions of the plenum.

The vacuum conveyor 80 in FIG. 5 differs from the vacuum conveyor 70 in FIG. 4 in that a single plenum chamber 82 extends the length of the vertical portion of the conveyor. Its blower 83 is controlled independently of the other blowers. Another version of a vacuum conveyor is shown in FIG. 6. The conveyor 84 has partitions 76 only at both ends of the lower radius plenum chamber 74″ so that the blowers 32′, 32″ for the pickup plenum chamber 74′ and the radius plenum chamber can be controlled independently of each other and of the two blowers 32 drawing air from the longer main plenum chamber 85 of the vacuum conveyor 84.

Figure 7:
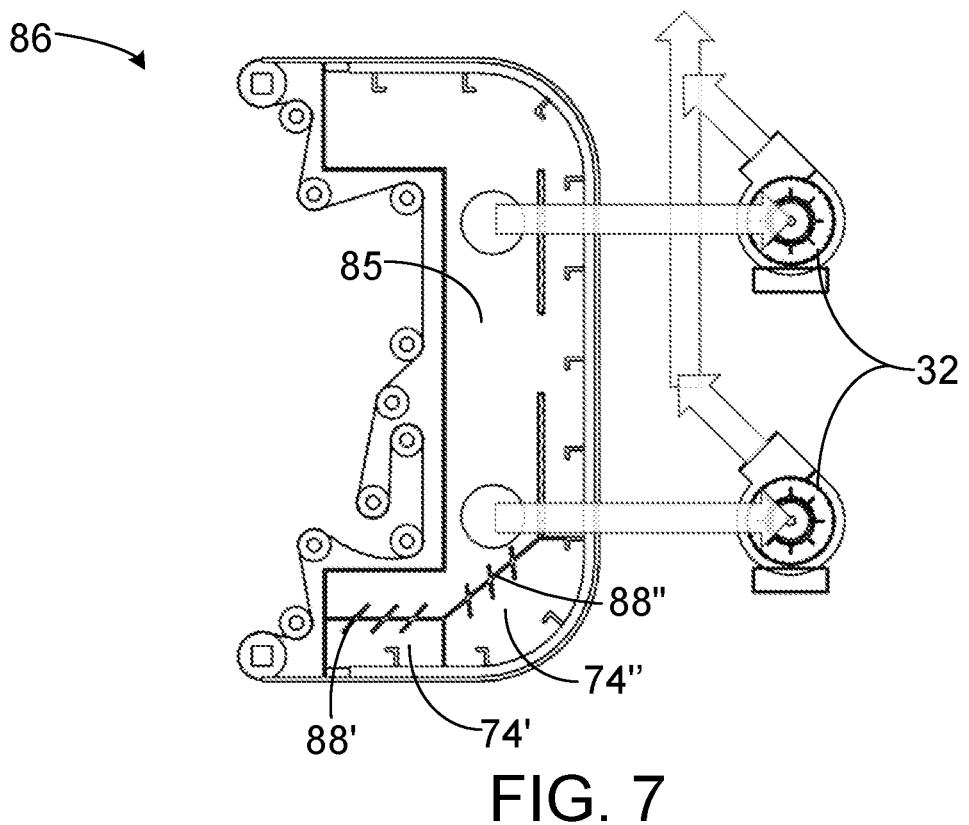
FIG. 7 is a schematic of the plenum portion of the vacuum conveyor as in FIG. 1 including adjustable dampers between the pickup zone and the vertical plenum and between the lower radius plenum chamber and the vertical plenum.

Instead of relying exclusively on blowers to control the differential pressures in multiple plenum chambers, the vacuum conveyor 86 of FIG. 7 uses dampers 88′, 88″ with adjustable blades in the pickup and lower radius plenum chambers 74′, 74″. The processor controls the pressure in the pickup and radius chambers 74′, 74″ independently by sending damper signals to the dampers 88′, 88″ to appropriately adjust the openings by changing the angle of the damper blades to allow more or less air to flow through and into the longer main plenum chamber 85. Only one or more blowers 32 drawing air from the main plenum chamber 85 are needed in this version. Adjustable dampers can be used in other of the multiple-chamber vacuum conveyors to reduce the number of variable-frequency drives and blower motors necessary for independent control of chamber pressures.

Figure 8:
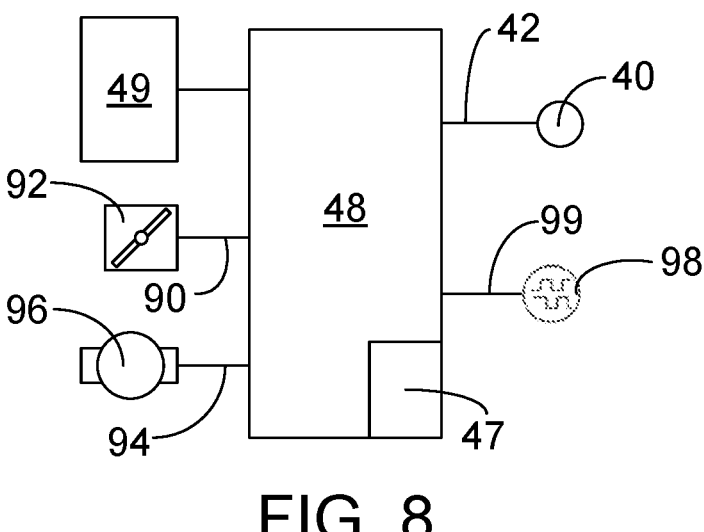
FIG. 8 is a schematic diagram of the control system of the vacuum conveyors of FIGS. 1 and 3-7.

One version of a closed-loop control system usable with the various vacuum conveyors is shown in FIG. 8. The processor 48 receives pressure signals 42 from one or more pressure sensors 40. The processor 48, executing program steps stored in program memory 47, determines the differential plenum pressures and compares them to differential pressure setpoints. The processor 48 continually outputs signals to the one or more variable-frequency drives 49 to adjust the blower speeds so that the differential plenum pressures match the differential pressure setpoints. If controllable dampers 88 are used, as in FIG. 7, the processor 48 sends damper signals 90 to the damper controllers 92 to close or open the dampers to adjust the plenum pressures appropriately. The processor 48 can also execute program steps to control the speed of the conveyor belt by controlling the belt's drive motor 96 via a motor-control signal 94. A rotary shaft encoder 98 mounted to the belt's drive shaft can provide a belt speed signal 99 to the processor 48 to close the belt-speed control loop and the blower control loops in some multi-chamber vacuum-conveyor configurations.

Although the features of the invention have been described in detail with respect to a specific vacuum-conveyor configuration, namely, a D-up inverter, the carryway sections of the D-up inverter, namely, horizontal sections, radius sections, and vertical sections, may appear in other vacuum-conveyor configurations. Although not present in the exemplary D-up inverter, inclined sections angled off vertical may be used in other configurations. And radius sections may be concave or convex depending on the configuration. And because different vacuum-conveyor configurations may open up different leakage paths than those described for the D-up inverter, the processor can adjust the air pressure in those areas for proper operation.

What is claimed is:

1. A vacuum conveyor for securely holding products comprising:
   a plenum having an open side;
   a carryway extending along the open side of the plenum;

a foraminous conveyor belt configured to advance along the carryway and seal the open side of the plenum and having an outer surface and a plurality of openings;
   one or more pressure sensors disposed in the plenum at sensor locations to measure the air pressure at the sensor locations and provide one or more air-pressure signals;
   a blower coupled to the plenum to suck air from the plenum to lower its air pressure and draw air through the openings in the conveyor belt and hold conveyed products to the conveyor belt's outer surface;
   a variable-frequency drive adjusting the speed of the blower;
   a processor receiving the one or more air-pressure signals from the one or more pressure sensors and controlling the variable-frequency drive to adjust the speed of the blower to adjust the air pressure in the plenum to accommodate a varying product density or the shape, size, or weight of conveyed products on the outer surface of the conveyor belt;
   wherein the processor limits the maximum speed of the blower to a predetermined value.

2. The vacuum conveyor as claimed in claim 1 comprising a plurality of blowers coupled to the plenum and controlled by the variable-frequency drive.

3. The vacuum conveyor as claimed in claim 1 comprising a plurality of blowers coupled to the plenum and an equal plurality of variable-frequency drives each adjusting the speed of an associated one of the blowers and wherein each blower is associated with a different one of the pressure sensors measuring the air-pressure in a portion of the plenum through which the associated blower sucks air.

4. The vacuum conveyor as claimed in claim 3 comprising a plurality of processors, each associated with one of the sensors and one of the variable-frequency drives.

5. The vacuum conveyor as claimed in claim 3 comprising partitions dividing the plenum into a plurality of chambers, each of the chambers coupled to a different one of the plurality of blowers and housing an associated one of the pressure sensors.

6. The vacuum conveyor as claimed in claim 5 wherein the blower in one or more of the chambers is operated at a speed different from the speeds of the blowers for other of the chambers.

7. The vacuum conveyor as claimed in claim 5 wherein the blower in one or more of the chambers is operated at a speed to produce a differential pressure that differs from the differential pressures for other of the chambers.

8. The vacuum conveyor as claimed in claim 5 wherein the carryway includes an inclined portion and wherein one or more of the chambers are on the inclined portion and wherein the blowers for the one or more chambers on the inclined portion are operated at a speed sufficient to produce enough of an increased pressure differential to prevent products from sliding down the conveyor belt on the inclined portion.

9. The vacuum conveyor as claimed in claim 5 comprising:
   a radius chamber positioned at a turn in the carryway and having an open end sealed by the conveyor belt; and
   a radius-chamber blower coupled to the radius chamber and operated at a speed greater than the speeds of the blowers in the other chambers to produce a differential air pressure in the radius chamber great enough to hold the conveyed products to the conveyor belt in the turn by compensating for the leakage of air through leakage paths in the conveyor belt negotiating the turn.

10. The vacuum conveyor as claimed in claim 1 comprising a pickup zone including:

a pickup chamber having an open end sealed by the conveyor belt; and a pickup blower coupled to the pickup chamber and operated at a speed great enough to produce a differential air pressure in the pickup chamber great enough to initially pull conveyed products against the outer surface of the conveyor belt and low enough to prevent can-destabilizing air currents.

11. The vacuum conveyor as claimed in claim 1 wherein the processor adjusts the air pressure in the plenum as a function of the kind of products being conveyed.

12. The vacuum conveyor as claimed in claim 1 wherein the processor maintains a constant air pressure in the plenum independent of changes in the density of the conveyed products on the outer surface of the conveyor belt.

13. The vacuum conveyor as claimed in claim 1 wherein the processor adjusts the air pressure to compensate for leakage paths opened up due to the configuration of the conveyor.

14. The vacuum conveyor as claimed in claim 1 wherein the processor adjusts the air pressure to compensate for local process disturbances that may destabilize the product being conveyed.

15. The vacuum conveyor as claimed in claim 1 comprising an infeed conveyor conveying products to the conveyor belt and a sensor sensing the density of products on the infeed conveyor and sending a product-density signal to the processor to control the variable-frequency drive to adjust the speed of the blower proportional to the density of the products on the infeed conveyor.

16. The vacuum conveyor as claimed in claim 1 comprising one or more adjustable dampers, each separating a plenum chamber from the rest of the plenum and wherein the processor adjusts the opening through the adjustable damper to adjust the air pressure in the plenum chamber.

17. A vacuum conveyor for securely holding products comprising:

a plenum having an open side;

a foraminous conveyor belt configured to advance along and seal the open side of the plenum and having an outer surface and a plurality of openings through the outer surface;

one or more adjustable dampers dividing the plenum into two or more plenum chambers opening onto the open side of the plenum;

one or more pressure sensors disposed in the plenum chambers at sensor locations to measure the air pressure at the sensor locations in the plenum chambers and provide air-pressure signals;

a blower coupled to the plenum to suck air from the plenum to lower its air pressure and draw air through the openings in the conveyor belt and hold conveyed products to the conveyor belt's outer surface;

a processor receiving the one or more air-pressure signals from the one or more pressure sensors and controlling the adjustable dampers to adjust the air pressure in the plenum chambers to accommodate a varying product density or the shape, size, or weight of conveyed products on the outer surface of the conveyor belt.

18. The vacuum conveyor as claimed in claim 17 comprising a variable-frequency drive adjusting the speed of the blower.

19. The vacuum conveyor as claimed in claim 17 wherein the processor adjusts the one or more adjustable dampers to maintain a constant air pressure in the plenum chambers independent of changes in the density of the conveyed products on the outer surface of the conveyor belt.

20. A vacuum conveyor for securely holding products comprising:

a plenum having walls and an open side;

a foraminous conveyor belt configured to advance along and seal the open side of the plenum and having an outer surface and a plurality of openings through the outer surface;

one or more pressure sensors disposed in the plenum at sensor locations to measure the air pressure at the sensor locations and provide one or more air-pressure signals;

a blower having a pressure-flow performance curve and being coupled to the plenum to suck air from the plenum to lower its air pressure and draw air through the openings in the conveyor belt and hold conveyed products to the conveyor belt's outer surface;

an exhaust through which the blower discharges air sucked from the plenum;

a variable-frequency drive adjusting the speed of the blower;

wherein the foraminous conveyor belt, the blower, and the exhaust resist airflow as characterized by a net resistive airflow curve;

a processor receiving the one or more air-pressure signals from the one or more pressure sensors and controlling the variable-frequency drive to shift the pressure-flow performance curve of the blower to match the net resistive airflow curve.

21. The vacuum conveyor as claimed in claim 20 wherein the one or more pressure sensors are differential pressure sensors mounted in the walls of the plenum.

22. The vacuum conveyor as claimed in claim 20 wherein the one or more pressure sensors are absolute pressure sensors and wherein the vacuum conveyor comprises another absolute pressure sensor outside the plenum providing ambient-pressure signals to the processor.

* * * * *